(12) United States Patent
Tsai et al.

(10) Patent No.: US 11,973,192 B2
(45) Date of Patent: Apr. 30, 2024

(54) ELECTRODE BODY AND CYLINDRICAL LITHIUM BATTERY CONTAINING THE SAME

(71) Applicant: E-ONE MOLI ENERGY CORP., Tainan (TW)

(72) Inventors: Jui-Min Tsai, Tainan (TW); Tsung-Yi Tsai, Tainan (TW); Kun-Miao Tsai, Tainan (TW); Wei-Dung Chang, Tainan (TW)

(73) Assignee: E-ONE MOLI ENERGY CORP., Tainan (TW)

(*) Notice: Subject to any disclaimer, the term of this patent is extended or adjusted under 35 U.S.C. 154(b) by 296 days.

(21) Appl. No.: 17/496,068

(22) Filed: Oct. 7, 2021

(65) Prior Publication Data
US 2022/0115713 A1 Apr. 14, 2022

(30) Foreign Application Priority Data

Oct. 12, 2020 (TW) .................................. 109135168
Oct. 12, 2020 (TW) .................................. 109213311

(51) Int. Cl.
*H01M 10/0587* (2010.01)
*H01M 10/04* (2006.01)
*H01M 10/0525* (2010.01)
*H01M 50/107* (2021.01)
*H01M 50/534* (2021.01)
*H01M 50/538* (2021.01)

(52) U.S. Cl.
CPC ... *H01M 10/0587* (2013.01); *H01M 10/0525* (2013.01); *H01M 50/107* (2021.01); *H01M 50/534* (2021.01); *H01M 50/538* (2021.01); *H01M 10/0422* (2013.01)

(58) Field of Classification Search
None
See application file for complete search history.

(56) References Cited

U.S. PATENT DOCUMENTS

2021/0265708 A1* 8/2021 Lim .................. H01M 10/0431

FOREIGN PATENT DOCUMENTS

| CN | 107834014 A | * | 3/2018 | ........ H01M 10/0431 |
| JP | 2011023130 A | * | 2/2011 | |
| KR | 20160108857 A | * | 9/2016 | ........ H01M 10/0422 |
| KR | 20170030290 A | * | 3/2017 | ............ H01M 10/04 |
| WO | WO-2020017923 A1 | * | 1/2020 | ........ H01M 10/0431 |

* cited by examiner

*Primary Examiner* — Robert S Carrico
(74) *Attorney, Agent, or Firm* — Cermak Nakajima & McGowan LLP; Shelly Guest Cermak

(57) ABSTRACT

The invention provides an electrode body for a cylindrical lithium battery, which is formed by winding a laminated body including a negative electrode sheet, a first separator, a positive electrode sheet, a plurality of cathode tabs and a plurality of anode tabs, wherein the negative sheet and the positive sheet have a negative electrode coating and a positive electrode coating, respectively. In the present invention, the positive electrode coating is provided on the positive electrode sheet in a specific configuration to increase the coating area of the positive electrode coating, thereby increasing the capacitance of the electrode body.

15 Claims, 8 Drawing Sheets

ELECTRODE BODY AND CYLINDRICAL LITHIUM BATTERY CONTAINING THE SAME

FIELD OF THE INVENTION

This application claims priority under 35 U.S.C. § 119 to Taiwanese Patent Application Nos. 109135168, filed Oct. 12, 2020, and 109213311, filed Oct. 12, 2020, the entireties of which are incorporated by reference herein.

The present invention relates to an electrode body and a cylindrical lithium battery containing the same.

DESCRIPTION OF THE PRIOR ART

With the advancement in technologies, more and more portable electronic products have become necessities in lives of people. Portable electronic products need batteries to supply power. Secondary batteries, featuring advantages of being memory-less and small in volume, are more environmentally friendly than primary batteries and thus more extensively applied. In small secondary batteries, lithium batteries have gradually replaced toxic nickel-cadmium batteries causing environmental pollutions as well as nickel metal hydride (NiMH) batteries having lower volume energy densities and higher temperatures.

Lithium batteries are most common in the forms of cylindrical lithium batteries and square lithium batteries. Cylindrical lithium batteries adopt a quite mature winding process, and have a high level of automation, stable product quality and lower costs. Although the structure of square lithium batteries is simpler compared to that of cylindrical lithium batteries, square lithium batteries can be manufactured in customization according to sizes of products, resulting in thousands of models on the market. Moreover, it is difficult to unify the manufacturing process of such square lithium batteries because of the overwhelming number of model numbers. Therefore, by adopting cylindrical lithium batteries of standard manufacturing, production processes can be ensured and substitution batteries can also be easily found.

In current designs, a cylindrical lithium battery usually utilizes combinations of one anode tab and one cathode tab, one cathode tab and two anode tabs, and two cathode tabs and two anode tabs. However, batteries in the combinations above still suffer from drawbacks of a short work time, a high operation temperature and high impedance, such that cylindrical lithium batteries cannot be properly applied in mobile products desperately needing high mobility and high capacity, and more particularly, in electric tools and electric vehicles.

SUMMARY OF THE INVENTION

In view of the above, it is an object of the present invention to provide a cylindrical lithium battery, which has low impedance and at the same time has a long work time and a low operating temperature, thereby significantly increasing the life cycle and applications of the battery.

To achieve the object above, the present invention provides an electrode body for a cylindrical lithium battery, which is a wound body formed by winding a laminated body including a negative electrode sheet, a first separator, a positive electrode sheet, a plurality of cathode tabs and a plurality of anode tabs. The negative electrode sheet is a negative electrode substrate. The negative electrode substrate has a negative electrode upper surface, and a negative electrode lower surface opposite to the negative upper surface. The negative electrode upper surface has a first negative electrode coating, a first bare negative electrode coating, a second bare negative electrode coating and a third bare negative electrode coating. The negative electrode lower surface has a second negative electrode coating, a fourth bare negative electrode coating, a fifth bare negative electrode coating and a sixth bare negative electrode coating. The first bare negative electrode coating and the fourth bare negative electrode coating are configured in opposite, the second bare negative electrode coating and the fifth bare negative electrode coating are configured in opposite, and the third bare negative electrode coating and the sixth bare negative electrode coating are configured in opposite. The first separator is disposed on the negative electrode sheet. The positive electrode sheet is a positive electrode substrate. The positive electrode substrate has a positive electrode upper surface, and a positive electrode lower surface opposite to the positive electrode upper surface, and the positive electrode lower surface faces the negative electrode upper surface. The positive electrode upper surface has a first positive electrode coating, a first bare positive electrode coating, a second bare positive electrode coating and a third bare positive electrode coating. The positive electrode lower surface has a second positive electrode coating, a fourth bare positive electrode coating, a fifth bare positive electrode coating and a sixth bare positive electrode coating. The first bare positive electrode coating and the fourth bare positive electrode coating are configured in opposite, the second bare positive electrode coating and the fifth bare positive electrode coating are configured as staggered, and the third bare positive electrode coating and the sixth bare positive electrode coating are configured in opposite. One end of a first cathode tab among the plurality of cathode tabs is connected to the first bare positive electrode coating or the fourth bare positive electrode coating, one end of a second cathode among the plurality of cathode tabs is connected to the third bare positive electrode coating or the sixth positive electrode coating, and the other end of the first cathode tab and the other end of the second cathode tab respectively extend outward and protrude from one end of the wound body. One end of a first anode tab among the plurality of anode tabs is connected to the first bare negative electrode coating or the fourth bare negative electrode coating, one end of a second anode tab among the plurality of anode tabs is connected to the second bare negative electrode coating or the fifth bare negative electrode coating, one end of a third anode tab among the plurality of cathode tabs is connected to the third negative electrode coating or the sixth bare negative electrode coating, and the other end of the first anode tab, the other end of the second anode tab and the other end of the third anode tab respectively extend outward and protrude from the other end of the wound body.

In one embodiment, the first cathode tab and the second cathode tab include aluminum foil.

In one embodiment, the first anode tab, the second anode tab and the third anode tab include copper foil, nickel foil or metal foil of a copper-nickel alloy.

In one embodiment, the negative electrode sheet includes a wound end and a tail end; the first bare negative electrode coating is disposed at the wound end of the negative electrode sheet, the second bare negative electrode coating is disposed at a distance between ⅓ and ⅔ of the negative electrode sheet from the wound end, and the third bare negative electrode coating is disposed at the tail end of the negative electrode sheet.

In one embodiment, the positive electrode sheet includes a wound end and a tail end; the first bare positive electrode coating is disposed at a distance between the wound end and ¼ of the positive electrode sheet from the wound end, and the third bare positive electrode coating is disposed at a distance between the tail end and ¼ of the positive electrode from the tail end.

In one embodiment, the fifth bare positive electrode coating faces the second bare negative electrode coating.

In one embodiment, the second bare positive electrode coating, the fourth bare positive electrode coating, the fifth bare positive electrode coating and the sixth bare positive electrode coating are respectively covered by adhesive tapes.

In one embodiment, the first bare positive electrode coating and the third bare positive electrode coating are respectively covered by adhesive tapes, and the adhesive tapes further respectively cover the first cathode tab and the second cathode tab.

In one embodiment, the electrode body further includes a second separator, and the negative electrode sheet is between the first separator and the second separator.

In one embodiment, the part of the first anode tab protruding from the wound body is in a first radial direction and is distanced by a first distance from a center, the part of the second anode tab protruding from the wound body is in a second radial direction and is distanced by a second distance from the center, and the part of the third anode tab protruding from the wound body is in a third radial direction and is distanced by a third distance from the center; the first radial direction, the second radial direction and the third radial direction partition the wound body into three different regions, the third distance is greater than the second distance, and the second distance is greater than the first distance.

In one embodiment, the parts of the first anode tab and the third anode tab protruding from the wound body are embossed, and the part of the second anode tab protruding from the wound body is not embossed.

In one embodiment, one end of the first cathode tab and one end of the second cathode tab are respectively connected to the first bare positive electrode coating and the third bare positive electrode coating, or one end of the first cathode tab and one end of the second cathode tab are respectively connected to the fourth bare positive electrode coating and the sixth bare positive electrode coating; one end of the first anode tab, one end of the second anode tab and one end of the third anode tab are respectively connected to the first bare negative electrode coating, the second bare negative electrode coating and the third bare negative electrode coating, or one end of the first anode tab, one end of the second anode tab and one end of the third anode tab are respectively connected to the fourth bare negative electrode coating, the fifth bare negative electrode coating and the sixth bare negative electrode coating.

In another embodiment, when one end of the first cathode tab and one end of the second cathode tab are respectively connected to the first bare positive electrode coating and the third bare positive electrode coating, one end of the first anode tab, one end of the second anode tab and one end of the third anode tab are respectively connected to the first bare negative electrode coating, the second bare negative electrode coating and the third bare negative electrode coating.

In another implementation, when one end of the first cathode tab and one end of the second cathode tab are respectively connected to the fourth bare positive electrode coating and the sixth bare positive electrode coating, one end of the first anode tab, one end of the second anode tab and one end of the third anode tab are respectively connected to the fourth bare negative electrode coating, the fifth bare negative electrode coating and the sixth bare negative electrode coating.

The present application further provides a cylindrical lithium battery including a housing, a positive electrode and a negative electrode. The housing includes a cover, a tank, and a top-down communicating accommodating space formed by mutually sealing and joining the cover and the tank. The positive electrode is embedded in the cover, and the negative electrode is embedded in the tank. The electrode body described above is disposed in the accommodating space, the electrode body is connected to the positive electrode through the first cathode tab and the second cathode tab, and the electrode body is connected to the negative electrode through the first anode tab, the second anode tab and the third anode tab.

In another embodiment, the cylindrical lithium battery further includes an electrolyte, which is disposed in the accommodating space.

In another embodiment, the cylindrical lithium battery includes an upper insulating sheet and a lower insulating sheet. The upper insulating sheet is disposed between the positive electrode and the end of the wound body, and the lower insulating sheet is disposed between the negative electrode and the other end of the wound body. The upper insulating sheet is a circular sheet structure, and has a partial fan-shaped hole allowing the other end of the first cathode tab and the other end of the second cathode tab to pass through the partial fan-shaped hole, so as to be connected to the positive electrode. The lower insulating sheet is a sheet structure shaped as a partial circle, and a radius of the partial circle is smaller than a radius of the other end of the wound body, allowing the second anode tab and the third anode tab to be connected to the negative electrode along an edge of the lower insulating sheet. Moreover, the sheet structure shaped as a particle circle has a hole at a center for the first anode tab to pass through the hole, so as to be connected to the negative electrode.

In another embodiment, the part of the first anode tab protruding from the wound body, the part of the second anode protruding from the wound body and the part of the third anode protruding from the wound body are sequentially laminated on the other end of the wound body, and the part of the first anode tab protruding from the wound body, the part of the second anode protruding from the wound body and the part of the third anode protruding from the wound body are welded together and further welded to the tank.

In the present invention, the positive electrode coating is provided on the positive electrode sheet in a specific configuration to increase the coating area of the positive electrode coating, thereby increasing the capacitance of the electrode body. Moreover, from a perspective of omitting the existence of the first separator, the configuration also provides the existence of the negative electrode coating on an upper surface of the negative electrode sheet at a location facing the positive electrode coating on a lower surface of the positive electrode sheet, thereby avoiding precipitation of metal and thus preventing danger.

These and other aspects of the present invention will become readily apparent to one skilled in the art with reference to the detailed description of the embodiments given with the accompanying drawings below.

BRIEF DESCRIPTION OF THE DRAWINGS

The sizes and scales of the structures shown in the drawings do not form limitations to actual implementations of the present invention.

DETAILED DESCRIPTION OF THE EMBODIMENTS

Figure 1:
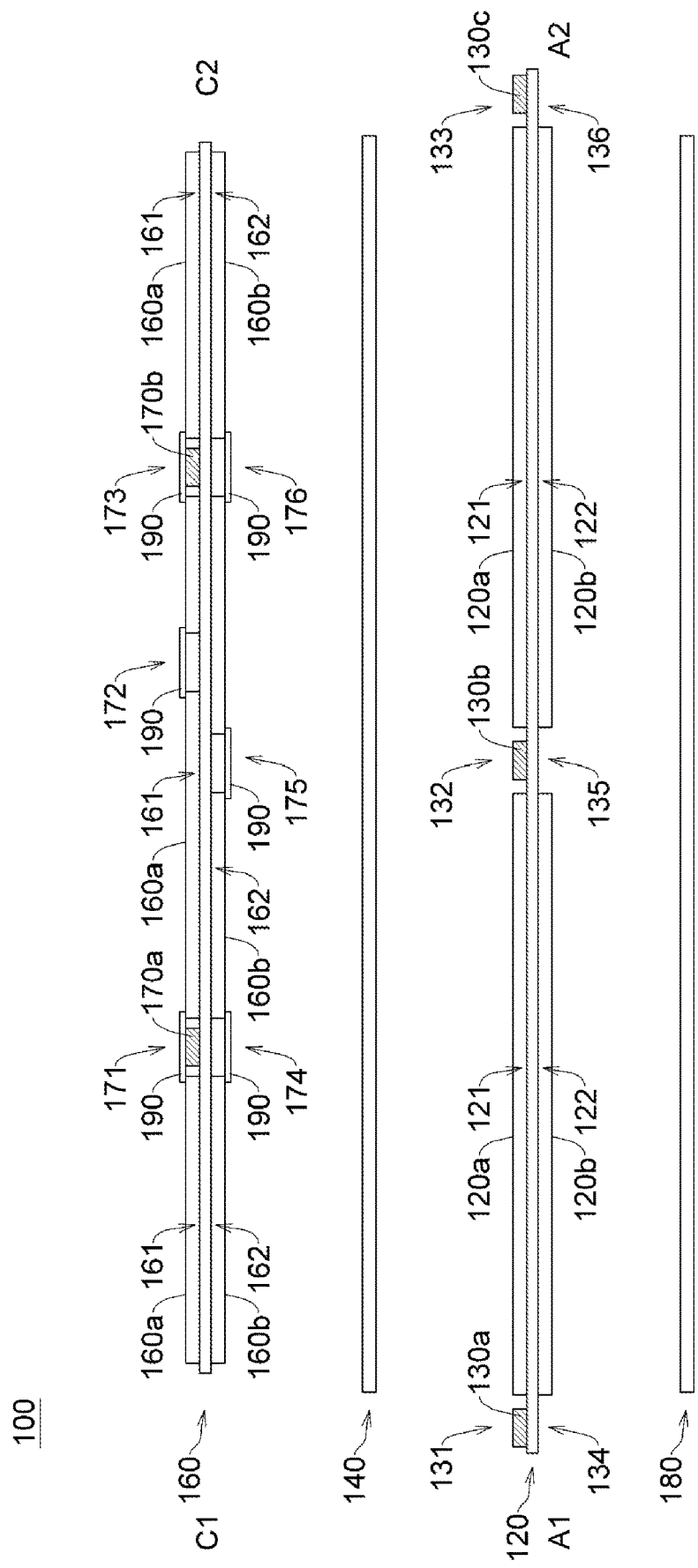
FIG. 1 is a section diagram of an unfolded laminated body of an electrode body according to an embodiment of the present invention.

The present invention provides an electrode body and a cylindrical lithium battery containing the same, and more particularly, a cylindrical lithium battery having at least two (for example, two, three or four) cathode tabs and at least three (for example, three, four or five) anode tabs.

The present invention is to be described in detail with the accompanying drawings in the embodiments below. In the accompanying drawings, the same and/or corresponding elements are represented by the same reference symbols and numerals.

Various embodiments are to be disclosed below. However, it is to be understood that the embodiments merely serve as example embodied in various forms. Moreover, each example provided in the various embodiments is reasonably expected to be exemplary and is not to be construed as limitations. Further, the drawings are not depicted true to actual sizes and ratios, and some features are enlarged so as to emphasize details of specific elements (it is reasonably expected that any sizes, materials and similar details shown in the drawings are exemplary rather than limitative). Therefore, specific structural and functional details disclosed herein are not to be interpreted as limitations, but are used as foundations for teaching a person skilled in the art the disclosed embodiments.

FIG. 1 shows a section diagram of an unfolded electrode body 100 according to an embodiment of the present invention. The electrode body 100 is a wound body formed by winding a laminated body from bottom to top, wherein the laminated body includes a negative electrode sheet 120, a first separator 140, a positive electrode sheet 160, a plurality of anode tabs 130 and a plurality of cathode tabs 170. The negative electrode sheet 120 is a negative electrode substrate. The negative electrode substrate has a negative electrode upper surface 120a, and a negative electrode lower surface 120b opposite to the negative electrode upper surface 120a. The negative electrode upper surface 120a has a first negative electrode coating 121, a first bare negative electrode coating 131, a second bare negative electrode coating 132 and a third bare negative electrode coating 133. The negative electrode lower surface 120b has a second negative electrode coating 122, a fourth bare negative electrode coating 134, a fifth bare negative electrode coating 135 and a sixth bare negative electrode coating 136. The first bare negative electrode coating 131 and the fourth negative electrode coating 134 are configured in opposite, the second bare negative electrode coating 132 and the fifth bare negative electrode coating 135 are configured in opposite, and the third bare negative electrode coating 133 and the sixth bare negative electrode coating 136 are configured in opposite. The first separator 140 is disposed on the negative electrode sheet 120. The positive electrode sheet 160 is a positive electrode substrate. The positive electrode substrate has a positive electrode upper surface 160a, and a positive electrode lower surface 160b opposite to the positive electrode upper surface 160a, wherein the positive electrode lower surface 160b faces the negative electrode upper surface 120a. The positive electrode upper surface 160a has a first positive electrode coating 161, a first bare positive electrode coating 171, a second bare positive electrode coating 172 and a third bare positive electrode coating 173. The positive electrode lower surface 160b has a second positive electrode coating 162, a fourth bare positive electrode coating 174, a fifth bare positive electrode coating 175 and a sixth bare positive electrode coating 176. The first bare positive electrode coating 171 and the fourth bare positive electrode coating 174 are configured in opposite, the second bare positive electrode coating 172 and the fifth bare positive electrode coating 175 are configured as staggered, and the third bare positive electrode coating 173 and the sixth bare positive electrode coating 176 are configured in opposite. One end of the first cathode tab 170a and one end of the second cathode tab 170b are respectively connected to the first bare positive electrode coating 171 and the third bare positive electrode coating 173; the other end of the first cathode tab 170a and the other end of the second cathode tab 170b respectively extend outward and protrude from one end of the wound body. One end of the first anode tab 130a, one end of the second anode tab 130b and one end of the third anode tab 130c are respectively connected to the first bare negative electrode coating 131, the second bare negative electrode coating 132 and the third bare negative electrode coating 133; the other end of the first anode tab 130a, the other end of the second anode tab 130b and the other end of the third anode tab 130c respectively extend outward and protrude from the other end of the wound body. In one embodiment, the fifth bare positive electrode coating 175 faces the second bare negative electrode coating 132. In one embodiment, a region of an upper surface of the positive electrode sheet other than the bare positive coating is the positive electrode coating, a region of a lower surface of the positive electrode sheet other than the bare positive electrode coating is the positive electrode coating, a region of an upper surface of the negative electrode sheet other than the bare negative electrode coating is the negative electrode coating, and a region of a lower surface of the negative electrode sheet other than the bare negative electrode coating is the negative electrode coating.

In one embodiment, the first cathode tab 170a and the second cathode tab 170b include aluminum foil. In one embodiment, the first anode tab 130a, the second anode tab 130b and the third anode tab 130c include copper foil, nickel foil or metal foil of a copper-nickel alloy. The bare negative electrode coating in the present invention refers to a region without the negative electrode coating. Similarly, the bare positive electrode coating in the present invention refers to a region without the positive electrode coating.

In one embodiment, the negative electrode sheet 120 includes a wound end A1 and a tail end A2; the first bare negative electrode coating 131 is disposed at the wound end A1 of the negative electrode sheet 120, the second bare negative electrode coating 132 is disposed at a distance between ⅓ and ⅔ of the negative electrode sheet 120 from the wound end A1, and the third bare negative electrode coating 133 is disposed at the tail end A2 of the negative electrode sheet 120.

In one embodiment, the positive electrode sheet 160 includes a wound end C1 and a tail end C2; the first bare positive electrode coating 171 is disposed at a distance between the wound end C1 and ¼ of the positive electrode sheet 160 from the wound end C1, and the third bare positive electrode coating 173 is disposed at a distance between the tail end C2 and ¼ of the positive electrode sheet 160 from the tail end C2.

In one embodiment, the second bare positive electrode coating 172, the fourth bare positive electrode coating 174, the fifth bare positive electrode coating 175 and the sixth bare positive electrode coating 176 are respectively covered by adhesive tapes 190 to prevent short circuitry. In one embodiment, the first bare positive electrode coating 171 and the third bare positive electrode coating 173 are respectively covered by adhesive tapes 190 to prevent short circuitry, and the adhesive tapes further respectively cover the first cathode tab 170a and the second cathode tab 170b.

In one embodiment, the electrode body 100 further includes a second separator 180, and the negative electrode sheet 120 is between the first separator 140 and the second separator 180.

In one embodiment, the cathode tabs and the anode tabs are respectively connected to the positive electrode sheet and the negative electrode sheet by means of welding. The welding is preferably by ultrasonic welding.

In another embodiment of the present invention, one end of the first cathode tab 170a and one end of the second cathode tab 170b are respectively connected to the fourth bare positive electrode coating 174 and the sixth bare positive electrode coating 176, but not respectively connected to the first bare positive electrode coating 171 and the third bare positive electrode coating 173; one end of the first anode tab 130a, one end of the second anode tab 130b and one end of the third anode tab 130c are respectively connected to the fourth bare negative electrode coating 134, the fifth bare negative electrode coating 135 and the sixth bare negative electrode coating 136, but not respectively connected to the first bare negative electrode coating 131, the second bare negative electrode coating 132 and the third bare negative electrode coating 133.

Figure 2:
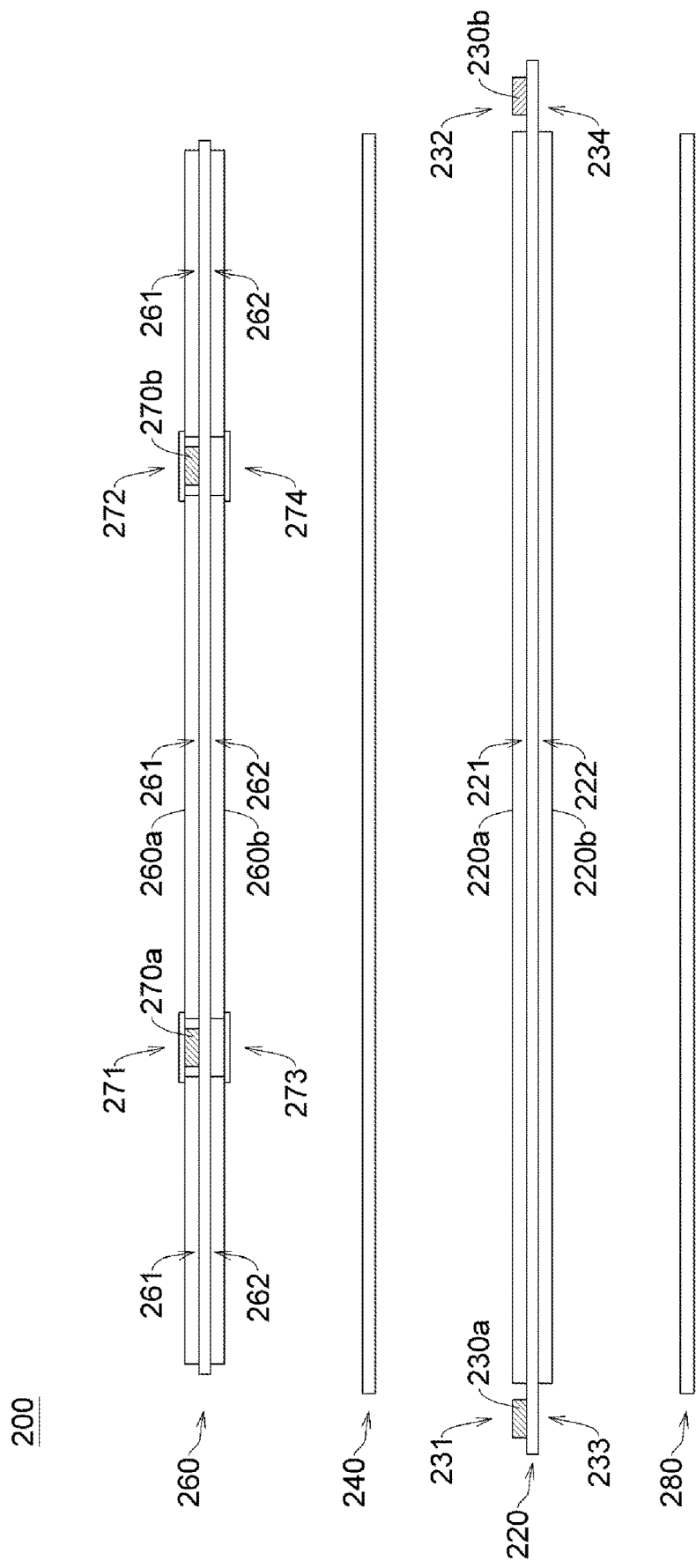
FIG. 2 is a section diagram of an unfolded laminated body of an electrode body according to a first comparison example.

FIG. 2 shows a section diagram of an unfolded laminated body of an electrode body 200 according to a first comparison example. In the first comparison example, as shown in FIG. 2, the electrode body 200 is a wound body formed by winding a laminated body from bottom to top. The laminated body includes a negative electrode sheet 220, a first separator 240, a positive electrode sheet 260, two cathode tabs 270 and two anode tabs 230. The negative electrode sheet 220 is a negative electrode substrate. The negative electrode substrate has a negative electrode upper surface 220a, and a negative electrode lower surface 220b opposite to the negative electrode upper surface 220a. The negative electrode upper surface 220a has a first negative electrode coating 221, a first bare negative electrode coating 231 and a second bare negative electrode coating 232. The negative electrode lower surface 220b has a second negative electrode coating 222, a third bare negative electrode coating 233 and a fourth bare negative electrode coating 234. The first bare negative electrode coating 231 and the third bare negative electrode coating 233 are configured in opposite, and the second bare negative electrode coating 232 and the fourth bare negative electrode coating 234 are configured in opposite. The first separator 240 is disposed on the negative electrode sheet 220. The positive electrode sheet 260 is a positive electrode substrate. The positive electrode substrate has a positive electrode upper surface 260a and a positive electrode lower surface 260b opposite to the positive electrode upper surface 260a, wherein the positive electrode lower surface 260b faces the negative electrode upper surface 220a (that is, the positive electrode lower surface 260b and the negative electrode upper surface 220a are interposed by the first separator 240 and configured in opposite). The positive electrode upper surface 260a has a first positive electrode coating 261, a first bare positive electrode coating 271 and a second bare positive electrode coating 272. The positive electrode lower surface 260b has a second positive electrode coating 262, a third bare positive electrode coating 273 and a fourth bare positive electrode coating 274. The first bare positive electrode coating 271 and the third bare positive electrode coating 273 are configured in opposite, and the second bare positive electrode coating 272 and the fourth bare positive electrode coating 274 are configured in opposite. One end of the first cathode tab 270a and one end of the second cathode tab 270b are respectively connected to the first bare positive electrode coating 271 and the second bare positive electrode coating 272, and the other end of the first cathode tab 270a and the other end of the second cathode tab 270b respectively extend outward and protrude from one end of the wound body. One end of the first anode tab 230a and one end of the second anode tab 230b are respectively connected to the first bare negative electrode coating 231 and the second bare negative electrode coating 232, and the other end of the first anode tab 230a and the other end of the second anode tab 230b respectively extend outward and protrude from the other end of the wound body. Compared to the laminated body of the electrode body 100 of an embodiment of the present invention, the laminated body shown in FIG. 2 includes only two cathode tabs and two anode tabs.

Figure 3A:
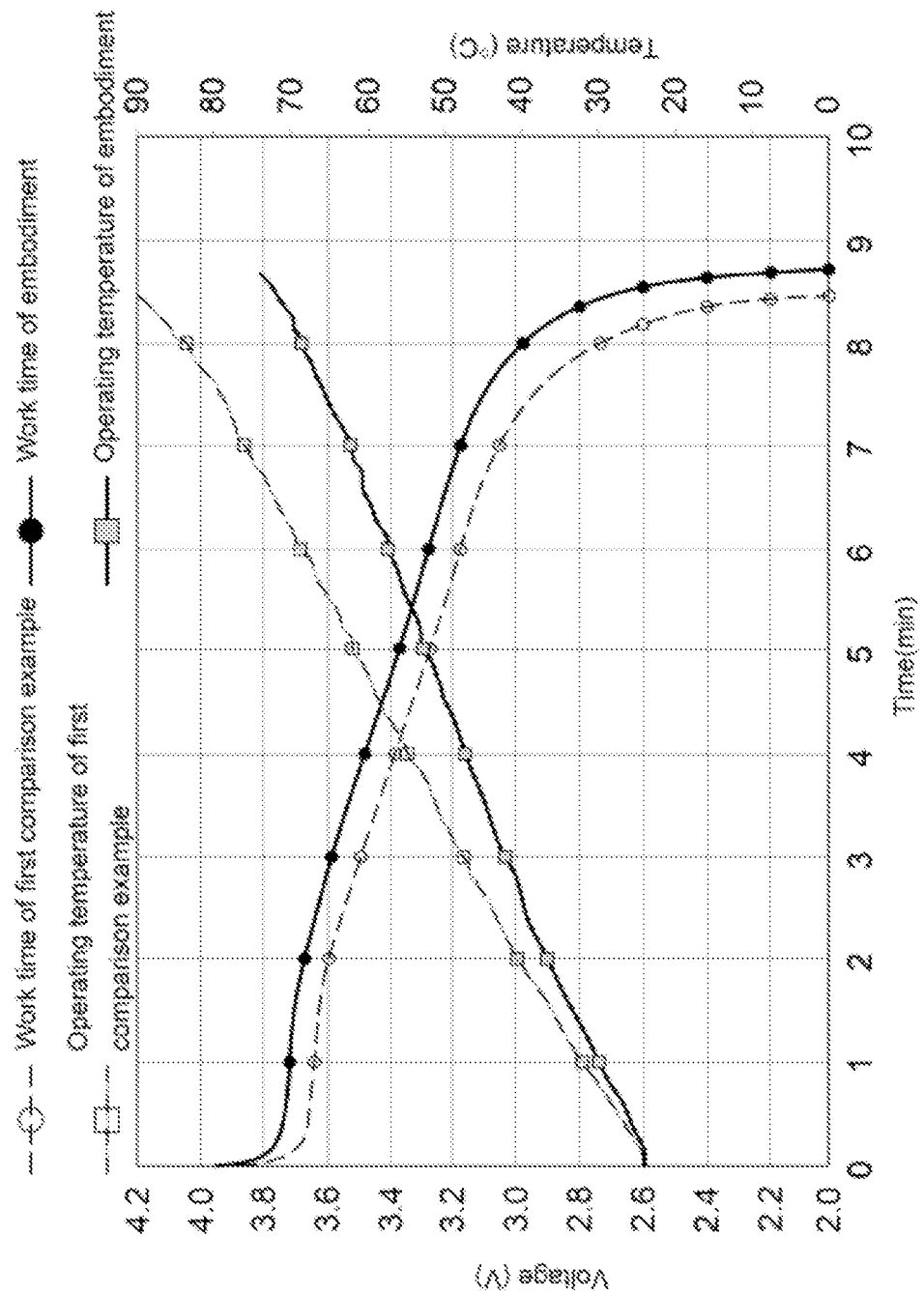
FIG. 3A is a relationship diagram of voltage, time and temperature according to an embodiment of the present invention and the first comparison example.
Figure 3B:
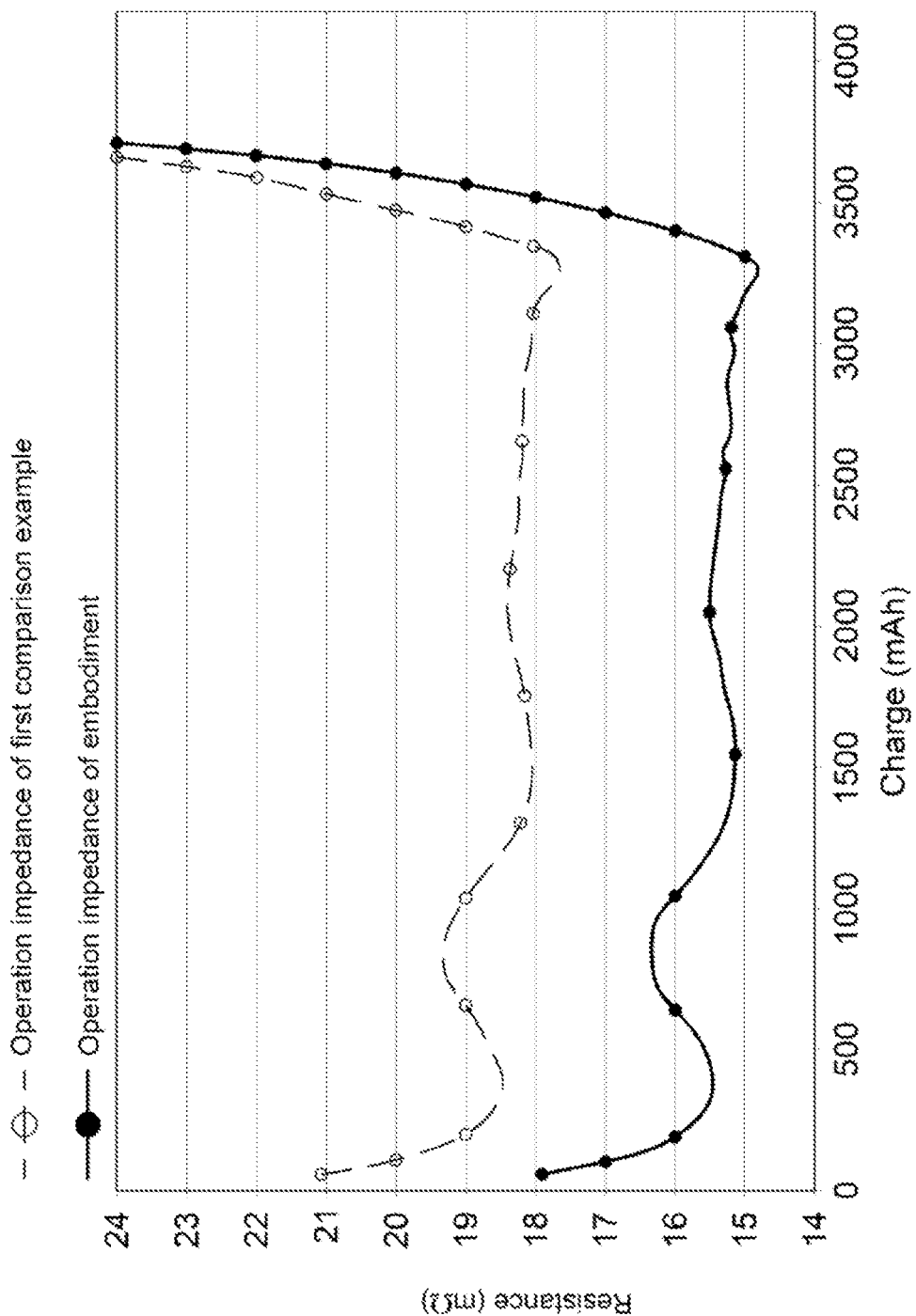
FIG. 3B is a relationship diagram of resistance and charge according to an embodiment of the present invention and the first comparison example.

FIG. 3A shows a relationship diagram of voltage, work time and operating temperature of one embodiment of the present invention and a comparison example. FIG. 3B shows a relationship diagram of resistance and charge according to an embodiment and a first comparison example of the present invention. FIG. 3A is obtained according testing under the following test conditions: charging by 1C to a rated voltage of 4.2 V and discharging by a large power of 95 W to 2.0 V at 23° C. FIG. 3B is obtained according to testing under the following test conditions: charging by 1C to a rated voltage of 4.2 V, and discharging alternately by 1 A and 10 A to 2.0 V at 23° C. It is seen from FIG. 3A and FIG. 3B, the electrode body of the embodiment of the present invention has three anode tabs, and thus has lower resistance, a lower operating temperature and a longer work time compared to the electrode body of the first comparison example. Thus, by applying the electrode body of the present invention to a cylindrical lithium battery, the life cycle and application of the battery can be significantly increased.

Figure 4:
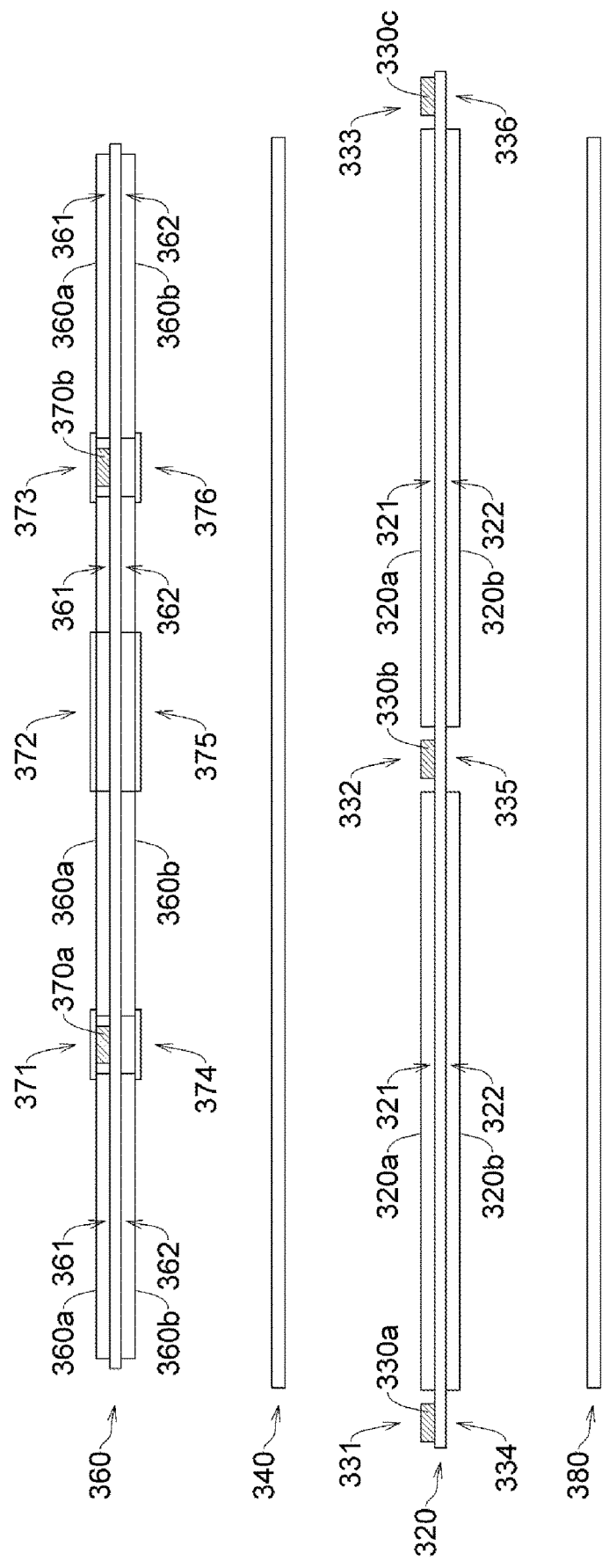
FIG. 4 is a section diagram of an unfolded laminated body of an electrode body according to a second comparison example.

FIG. 4 shows a section diagram of an unfolded laminated body of an electrode body according to a second comparison example. In the second comparison example, as shown in FIG. 4, an electrode body 300 is a wound body formed by winding a laminated body from bottom to top. The laminated body includes a negative electrode sheet 320, a first separator 340, a positive electrode sheet 360, two cathode tabs 370 and three anode tabs 330. The negative electrode sheet 320 is a negative electrode substrate. The negative electrode substrate has a negative electrode upper surface 320a, and a negative electrode lower surface 320b opposite to the negative electrode upper surface 320a. The negative electrode upper surface 320a has a first negative electrode coating 321, a first bare negative electrode coating 331, a second bare negative electrode coating 332 and a third bare negative electrode coating 333. The negative electrode lower surface 320b has a second negative electrode coating 322, a fourth bare negative electrode coating 334, a fifth bare negative electrode coating 335 and a sixth bare negative electrode coating 336. The first bare negative electrode coating 331 and the fourth bare negative electrode coating 334 are configured in opposite, the second bare negative electrode coating 332 and the fifth bare negative electrode coating 335 are configured in opposite, and the third bare negative electrode coating 333 and the sixth bare negative electrode coating 336 are configured in opposite. The first separator 340 is disposed on the negative electrode sheet 320. The positive electrode sheet 360 is a positive electrode substrate. The positive electrode substrate has a positive electrode upper surface 360a, and a positive electrode lower surface 360b opposite to the positive electrode upper surface 360a, wherein the positive electrode lower surface 360b faces the negative electrode upper surface 320a. The positive electrode upper surface 360a has a first positive electrode coating 361, a first bare positive electrode coating 371, a second bare positive electrode coating 372 and a third bare positive electrode coating 373. The positive electrode lower surface 360b has a second positive electrode coating 362, a fourth bare positive electrode coating 374, a fifth bare positive electrode coating 375 and a sixth bare positive electrode coating 376. The first bare positive electrode coating 371 and the fourth bare positive electrode coating 374 are configured in opposite, the second bare positive electrode coating 372 and the fifth bare positive electrode coating 375 are configured in opposite, the third bare positive electrode coating 373 and the sixth bare positive electrode coating 376 are configured in opposite, and the fifth bare positive electrode coating 375 faces the second bare negative electrode coating 332. One end of the first cathode tab 370a and one end of the second cathode tab 370b are respectively connected to the first bare positive electrode coating 371 and the third bare positive electrode coating 373, and the other end of the first cathode tab 370a and the other end of the second cathode tab 370b respectively extend outward and protrude from the other end of the wound body. One end of the first anode tab 330a, one end of the second anode tab 330b and one end of the third anode tab 330c are respectively connected to the first bare negative electrode coating 331, the second bare negative electrode coating 332 and the third bare negative electrode coating 333, and the other end of the first anode tab 330a, the other end of the second anode tab 330b and the other end of the third anode tab 330c respectively extend outward and protrude from the other end of the wound body.

Comparing the electrode body of an embodiment of the present invention with the second comparison example, because the area of the positive electrode sheet 360 of the electrode body of the second comparison example applied with a positive electrode coating is reduced, an issue of low capacitance is incurred. In one embodiment, as shown in FIG. 1, the coating area is increased by configuring the second bare positive electrode coating 172 and the fifth bare positive electrode coating 175 in a staggered manner, and capacitance is also increased. In one example, when the total length of the positive electrode sheet is 1200 mm, the difference in the total lengths of the coating areas of the electrode body of an embodiment of the present invention and the electrode body of the second comparison example is 42 mm, meaning that the capacitance difference between the two is 42/1200=3.5%. It is apparent that the electrode body of the present invention has outstanding capacitance. Hence, compared to the laminated body of the electrode body 100 of an embodiment of the present invention, although a laminated body in FIG. 4 similarly includes two cathode tabs and three anode tabs, space is not efficiently used in the configuration of the positive electrode coating thereof, resulting a small coating area of the positive electrode coating and hence a failure in increasing the capacitance. More specifically, in FIG. 4, the second bare positive electrode coating 372 and the fifth bare positive electrode coating 375 of the laminated body 300 are not arranged in a staggered manner as the second bare positive electrode coating 172 and the fifth bare positive electrode coating 175 in FIG. 1, such that respective areas of the second bare positive electrode coating 372 and the fifth bare positive electrode coating 375 are both larger than the area of the second bare negative electrode coating 332, resulting in a smaller positive electrode coating and hence a failure in increasing the capacitance. In contrast, the second bare positive electrode coating 172 and the fifth bare positive electrode coating 175 in FIG. 1 are in configured in a staggered manner, so that the respective areas of the second bare positive electrode coating 172 and the fifth bare positive electrode coating 175 approximate (or even equal to) the area of the second bare negative electrode coating 132, resulting in a larger positive electrode coating and hence increased capacitance.

In one embodiment, to configure the second bare positive electrode coating 172 and the fifth bare positive electrode coating 175 in a staggered manner, a prepared positive electrode and negative electrode raw material mixture liquid is applied in synchronization by a coating mechanism to the positive electrode upper surface 160a, the positive electrode lower surface 160b, the negative electrode upper surface 120a and the negative electrode lower surface 120b. A person skilled in the art can achieve the result of configuring the second bare positive electrode coating 172 and the fifth bare positive electrode coating 175 in a staggered manner by setting related parameters, such as the position, length, width and gap of the coating, according to ordinary skill in the art. As described above, such configuration increases the coating area of the coatings, thereby increasing the capacitance.

Figure 5:
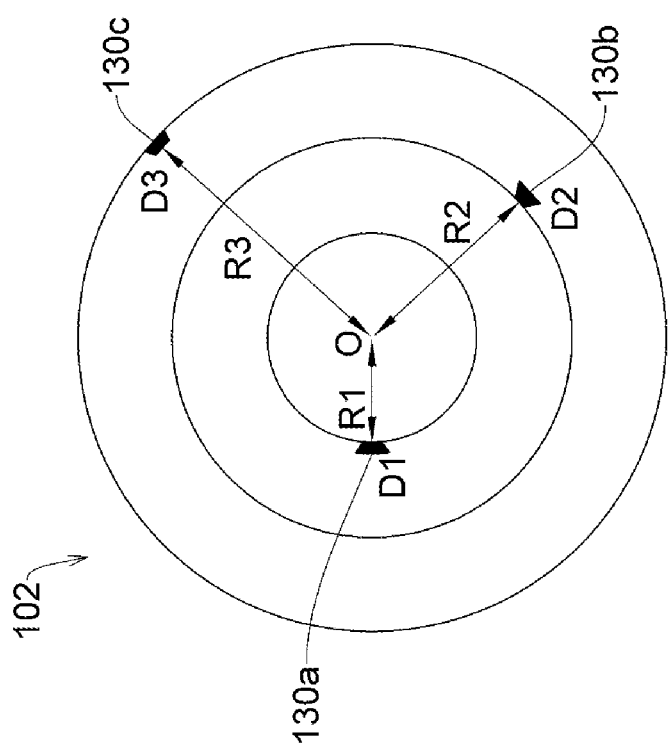
FIG. 5 is a section schematic diagram of a wound laminated body of an electrode body according to an embodiment of the present invention.

FIG. 5 shows a section schematic diagram of a wound laminated body of the electrode body 100 according to an embodiment of the present invention. The part of the first anode tab 130a protruding from the wound body 102 is in a radial direction D1 and is distanced by a first distance R1 from a center O, the part of the second anode tab 130b protruding from the wound body 102 is in a second radial direction D2 and is distanced by a second distance R2 from the center O, and the part of the third anode tab 130c protruding from the wound body 102 is in a third radial direction D3 and is distanced by a third distance R3 from the center O. The first radial direction D1, the second radial direction D2 and the third radial direction D3 partition the wound body into three different regions, and included angles between the first radial direction D1, the second radial direction D2 and the third radial direction D3 are not specifically defined. Moreover, the third distance R3 is greater than the second distance R2, and the second distance R2 is greater than first distance R1. Such configuration is beneficial for more easily welding the anode tabs during an assembly process for forming a battery. It is also known from FIG. 5, the wound body can be obtained after winding from the wound end of the electrode body 100 of an embodiment of the present invention.

Figure 6A:
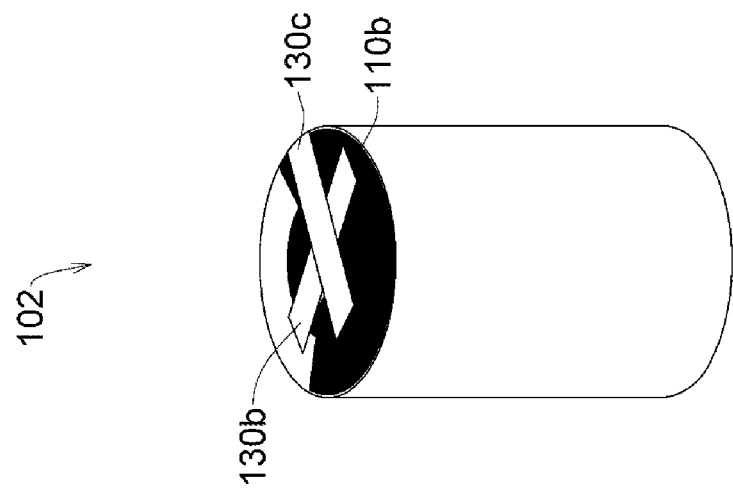
FIG. 6A and FIG. 6B are respectively schematic diagrams of before and after assembling anode tabs according to an embodiment of the present invention.
Figure 6B:
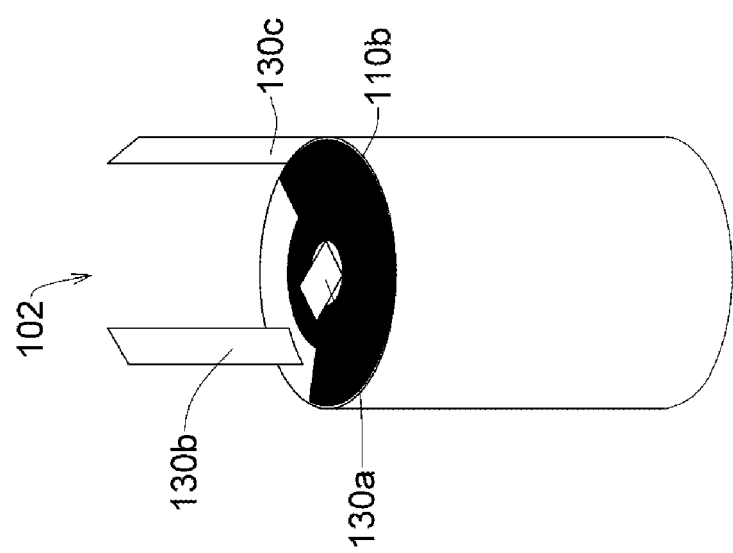

FIG. 6A and FIG. 6B show schematic diagrams of the first anode tab 130a, the second anode tab 130b and the third anode tab 130c of the electrode body 100 before and after assembly according to an embodiment of the present invention. The shaded part on the top of the electrode body 100 is an insulating sheet 110b. In FIG. 6A, the first anode tab 130a, the second anode tab 130b and the third anode tab 130c of the electrode body 100 welded to be the wound body 102 are originally perpendicular to the insulating sheet 110b. To provide ease for assembly, in FIG. 6B, the first anode tab 130a, the second anode tab 130b and the third anode tab 130c are bent to become close to the insulating sheet 110b, the second anode tab 130b is above the first anode tab 130a, and the third anode tab 130c is above the second anode tab 130b.

Figure 7:
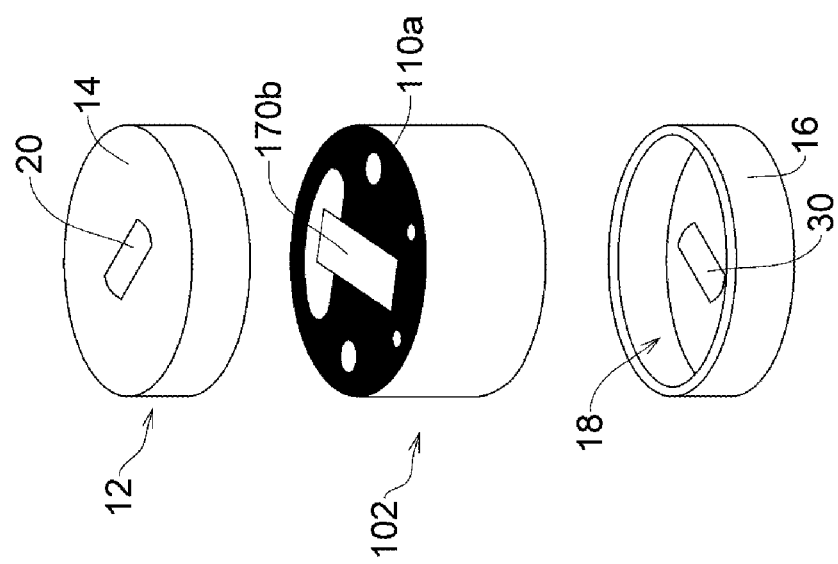
FIG. 7 is an exploded schematic diagram of a cylindrical lithium battery in an implementation according to another embodiment of the present invention.

FIG. 7 shows an exploded schematic diagram of a cylindrical lithium battery 10 in an implementation according to another embodiment of the present invention. The cylindrical lithium battery 10 includes a housing 12, a positive electrode 20 and a negative electrode 30. The housing 12 includes a cover 14, a tank 16, and a top-down communicating accommodating space 18 formed by mutually sealing and joining the cover 14 and the tank 16. The positive electrode 20 is embedded in the cover 14, and the negative electrode 30 is embedded in the tank 16. The electrode body 100 as described in the embodiment above is arranged in the accommodating space 18. The electrode body 100 is electrically connected to the positive electrode 20 through the first cathode tab 170a and the second cathode tab 170b, and the electrode body 100 is further electrically connected to the negative electrode 30 through the first anode tab 130a, the second anode tab 130b and the third anode tab 130c.

The cylindrical lithium battery 10 in an implementation according to another embodiment of the present invention further includes an upper insulating sheet 110a (as shown in FIG. 7) and a lower insulating sheet 110b (as shown in FIG. 6A and FIG. 6B). The upper insulating sheet 110a is disposed between the positive electrode 20 and the end of the wound body 102, and the lower insulating sheet 110b is disposed between the negative electrode 30 and the other end of the wound body 102. The upper insulating sheet 110a is a circular sheet structure and has a partial fan-shaped hole, allowing the other end of the first cathode tab 170a and the other end of the second cathode tab 170b to pass through the partial fan-shaped hole, so as to be electrically connected to the positive electrode 20 (not shown). After passing through the partial fan-shaped hole, the first cathode tab and the second cathode tab are bent toward the axis direction of the center of the wound body 102 and appear as a laminated structure (that is, the second cathode tab 170b is laminated on the first cathode tab 170a), so as to provide ease for subsequent assembly for a cylindrical lithium battery. Referring to FIG. 6A, FIG. 6B and FIG. 7, the lower insulating sheet 110b is a sheet structure shaped as a partial circle, and the radius of the partial circle is smaller than the radius of the other end of the wound body 102, so as to allow the anode cathode tab 130b and the third anode tab 130c to be electrically connected to the negative electrode 30 along the edge of the lower insulating sheet. Moreover, a hole is provided at the center of the sheet structure shaped as a partial circle, allowing the first anode tab 130a to pass through the hole so as to be electrically connected to the negative electrode 30 (not shown).

Although one or more embodiments are used to describe the electrode body and the cylindrical lithium body containing the electrode body of the present invention, it is to be understood that the disclosure of the present invention is not limited to the embodiments given in the disclosure. For example, the numbers of the cathode tabs and the anode tabs are not limited to the examples in the disclosed embodiments. Various modifications and similar arrangements included within the spirit and aspects covered by the appended claims should be given with the broadest interpretation so as to encompass all similar modifications and structures. The disclosure of the present invention also includes all embodiments within the appended claims.

What is claimed is:

1. An electrode body, applied to a cylindrical lithium battery, which is a wound body formed by winding a laminated body, the laminated body comprising:
   a negative electrode sheet, being a negative electrode substrate, the negative electrode substrate having a negative electrode upper surface and a negative electrode lower surface opposite to the negative electrode upper surface, the negative electrode upper surface having a first negative electrode coating, a first bare negative electrode coating, a second bare negative electrode coating and a third bare negative electrode coating, the negative electrode lower surface having a second negative electrode coating, a fourth bare negative electrode coating, a fifth bare negative electrode coating and a sixth bare negative electrode coating, wherein the first bare negative electrode coating and the fourth bare negative electrode coating are configured in opposite, the second bare negative electrode coating and the fifth bare negative electrode coating are configured in opposite, and the third bare negative electrode coating and the sixth bare negative electrode coating are configured in opposite;
   a first separator, disposed on the negative electrode sheet;
   a positive electrode sheet, disposed on the first separator, the positive electrode sheet being a positive electrode substrate, the positive electrode substrate having a positive electrode upper surface and a positive electrode lower surface opposite to the positive electrode upper surface, the positive electrode lower surface facing the negative electrode upper surface, the positive electrode upper surface having a first positive electrode coating, a first bare positive electrode coating, a second bare positive electrode coating and a third bare positive electrode coating, the positive electrode lower surface having a second positive electrode coating, a fourth bare positive electrode coating, a fifth bare positive electrode coating and a sixth bare positive electrode coating, wherein the first bare positive electrode coating and the fourth bare positive electrode coating are configured in opposite, the second bare positive electrode coating and the fifth bare positive electrode coating are configured as fully staggered, and the third bare positive electrode coating and the sixth bare positive electrode coating are configured in opposite;

a plurality of cathode tabs, one end of a first cathode tab among the plurality of cathode tabs being connected to the first bare positive electrode coating or the fourth bare positive electrode coating, one end of a second cathode tab among the plurality of cathode tabs being connected to the third bare positive electrode coating or the sixth bare positive electrode coating, one other end of the first cathode tab and one other end of the second cathode tab respectively extending outward and protruding from one end of the wound body; and a plurality of anode tabs, one end of a first anode tab among the plurality of anode tabs being connected to the first bare negative electrode coating or the fourth bare negative electrode coating, one end of a second anode tab among the plurality of anode tabs being connected to the second bare negative electrode coating or the fifth bare negative electrode coating, one end of a third anode tab among the plurality of anode tabs being connected to the third bare negative electrode coating or the sixth bare negative electrode coating, one other end of the first anode tab, one other end of the second anode tab and one other end of the third anode tab respectively extending outward and protruding from one other end of the wound body.

2. The electrode body according to claim 1, wherein the first cathode tab and the second cathode tab comprise aluminum foil.

3. The electrode body according to claim 1, wherein the first anode tab, the second anode tab and the third anode tab comprise copper foil, nickel foil or metal foil of a copper-nickel alloy.

4. The electrode body according to claim 1, wherein the negative electrode sheet comprises a wound end and a tail end, the first bare negative electrode coating is disposed at the wound end of the negative electrode sheet, the second bare negative electrode coating is disposed at a distance between ⅓ and ⅔ of the negative electrode sheet from the wound end, and the third bare negative electrode coating is disposed at the tail end of the negative electrode sheet.

5. The electrode body according to claim 1, wherein the positive electrode sheet comprises a wound end and a tail end, the first bare positive electrode coating is disposed at a distance between the wound end and ¼ of the positive electrode sheet from the wound end, and the third bare positive electrode coating is disposed at a distance between the tail end and ¼ of the positive electrode sheet from the tail end.

6. The electrode body according to claim 1, wherein the fifth bare positive electrode coating faces the second bare negative electrode coating.

7. The electrode body according to claim 1, wherein the second bare positive electrode coating, the fourth bare positive electrode coating, the fifth bare positive electrode coating and the sixth bare positive electrode coating are respectively covered by adhesive tapes.

8. The electrode body according to claim 1, wherein the first bare positive electrode coating and the third bare positive electrode coating are respectively covered by adhesive tapes, and the adhesive tapes further respectively cover the first cathode tab and the second cathode tab.

9. The electrode body according to claim 1, further comprising a second separator, wherein the negative electrode sheet is between the first separator and the second separator.

10. The electrode body according to claim 1, wherein a part of the first anode tab protruding from the wound body is in a first radial direction and is distanced by a first distance from a center, a part of the second anode tab protruding from the wound body is in a second radial direction and is distanced by a second distance from the center, a part of the third anode tab protruding from the wound body is in a third radial direction and is distanced by a third distance from the center, the first radial direction, the second radial direction and the third radial direction partition the wound body into three different regions, the third distance is greater than the second distance, and the second distance is greater than the first distance.

11. The electrode body according to claim 1, wherein one end of the first cathode tab and one end of the second cathode tab are respectively connected to the first bare positive electrode coating and the third bare positive electrode coating, or the one end of the first cathode tab and the one end of the second cathode tab are respectively connected to the fourth bare positive electrode coating and the sixth bare positive electrode coating; one end of the first anode tab, one end of the second anode tab and one end of the third anode tab are respectively connected to the first bare negative electrode coating, the second bare negative electrode coating and the third bare negative electrode coating, or the end of the first anode tab, the one end of the second anode tab and the one end of the third anode tab are respectively connected to the fourth bare negative electrode coating, the fifth bare negative electrode coating and the sixth bare negative electrode coating.

12. A cylindrical lithium battery, comprising:
a housing, comprising a cover, a tank, and a top-down communicating accommodating space formed by mutually sealing and joining the cover and the tank;
a positive electrode, embedded in the cover;
a negative electrode, embedded in the tank; and
the electrode body of claim 1, disposed in the accommodating space, the electrode body connected to the positive electrode through the first cathode tab and the second cathode tab, the electrode body connected to the negative electrode through the first anode tab, the second anode tab and the third anode tab.

13. The cylindrical lithium battery according to claim 12, further comprising an electrolyte, the electrolyte disposed in the accommodating space.

14. The cylindrical lithium battery according to claim 12, further comprising an upper insulating sheet and a lower insulating sheet, the upper insulating sheet disposed between the positive electrode and the end of the wound body, the lower insulating sheet disposed between the negative electrode and the one other end of the wound body; wherein, the upper insulating sheet is a circular sheet structure, and has a partial fan-shaped hole, allowing the one other end of the first cathode tab and the one other end of the second cathode tab to pass through the partial fan-shape hole so as to be connected to the positive electrode; the lower insulating sheet is a sheet structure shaped as a partial circle, a radius of the partial circle is smaller than a radius of the one other end of the wound body, allowing the second anode tab and the third anode tab to be electrically connected to the negative electrode along an edge of the lower insulating sheet, and a center of the sheet structure shaped as a partial circle has a hole, allowing the first anode tab to pass through the hole so as to be connected to the negative electrode.

15. The cylindrical lithium battery according to claim 14, wherein the part of the first anode tab protruding from the wound body, the part of the second anode tab protruding from the wound body and the part of the third anode tab protruding from the wound body are sequentially laminated on the other end of the wound body, and the part of the first anode tab protruding from the wound body, the part of the second anode tab protruding from the wound body and the part of the third anode tab protruding from the wound body are welded together and are welded with the tank.

\* \* \* \* \*